United States Patent [19]

Vaughn

[11] Patent Number: 4,687,824

[45] Date of Patent: Aug. 18, 1987

[54] QUATERNARY AMMONIUM POLYMERS

[75] Inventor: Walter L. Vaughn, Lake Jackson, Tex.

[73] Assignee: The Dow Chemical Company, Midland, Mich.

[21] Appl. No.: 850,787

[22] Filed: Apr. 11, 1986

Related U.S. Application Data

[62] Division of Ser. No. 528,755, Sep. 1, 1983, Pat. No. 4,596,888.

[51] Int. Cl.$^4$ .............................................. C08F 22/38
[52] U.S. Cl. ................................ 526/292.2; 526/288; 526/304
[58] Field of Search ..................... 526/288, 292.2, 304, 526/312

[56] References Cited

U.S. PATENT DOCUMENTS 3,957,869 5/1976 Nagy ................................. 526/304

FOREIGN PATENT DOCUMENTS 16033 4/1974 Japan .

Primary Examiner—Christopher Henderson

[57] ABSTRACT

Novel polymers are prepared from monomers comprising the reaction product of a vinyl functional monoahl (e.g., hydroxypropyl acrylate) with a halohydroxyalkyl quaternary ammonium compound (e.g., 2-hydroxy-3-chloropropyl ammonium chloride) or a glycidyl trialkyl ammonium compound. The polymers exhibit a very high affinity for water.

3 Claims, No Drawings

QUATERNARY AMMONIUM POLYMERS

CROSS-REFERENCE TO RELATED APPLICATION

This is a divisional of application Ser. No. 528,755, filed Sept. 1, 1983, now U.S. Pat. No. 4,596,888.

BACKGROUND OF THE INVENTION

This invention relates to monomers comprising cationic moieties and to polymers prepared therefrom.

Quaternary ammonium derivatives of acrylic acid or of an acrylamide are well known in the art. Examples of known monomers, polymers and copolymeric derivatives thereof are disclosed in U.S. Pat. Nos. 2,677,679; 3,174,874; 3,248,352; 3,329,706 and 3,744,566. Such polymeric and copolymeric derivatives have found numerous uses such as retention aids for fillers and pigments in papermaking, flocculants of sewage and waste waters, antistatic finishes, wettable coatings and in enhanced oil recovery.

Unfortunately, the polymers of the prior art contain either short side chains or relatively long hydrophobic side chains which connect the ethylenically unsaturated portion of the monomer (for example, the acrylate moiety) to the ammonium moiety. Short side chains do not allow for a great volume of water of hydration in order that the solubility of the resulting polymer be high. Monomers containing long side chains polymerize slowly and often yield polymers which are not water-compatible.

In view of the deficiencies of the prior art, it would be highly desirable to provide a polymer which has a high affinity for water and is highly wettable; and which comprises monomers comprising a quaternary ammonium moiety.

SUMMARY OF THE INVENTION

In one aspect, the present invention is a novel monomer which is the reaction product of a vinyl functional monoahl and a halohydroxyalkyl quaternary ammonium compound or a glycidyl trialkyl ammonium compound.

In another aspect, the present invention is a homopolymer which is the polymerization product of the novel monomer of this invention.

In yet another aspect, the present invention is an interpolymer which is the polymerization product of the novel monomer of this invention with at least one other ethylenically unsaturated monomer.

The homopolymers of this invention are highly water-soluble and highly hydrophilic. Similarly, the interpolymers of this invention have a high affinity for water. The homopolymers and interpolymers of this invention have uses in a wide variety of industrial applications.

DETAILED DESCRIPTION OF THE INVENTION

Examples of halohydroxyalkyl quaternary ammonium compounds include the halohydroxyalkyl ammonium salts such as 2-hydroxy-3-chloropropyltrimethylammonium chloride and similar hydroxyalkyltrialkyl ammonium halides. The hydroxyhaloalkyl trialkyl ammonium halides can be converted to epoxides and are disclosed in U.S. Pat. No. 3,329,706 which is incorporated herein by reference. Other suitable epoxides are also represented as follows:

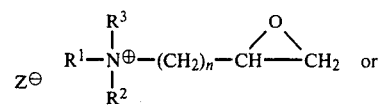

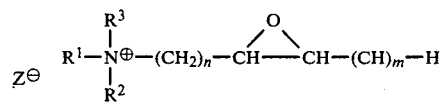

wherein n is from 2 to about 3, m is from 0 to about 3, and $R^1$, $R^2$ and $R^3$ are individually lower alkyl, hydroxy lower alkyl, or $R^2$ and $R^3$ together with the nitrogen atom to which each is attached can form a cyclic ring preferably containing from 5 to about 8 carbon atoms. Preferably $R^1$-$R^3$ are lower alkyl such as methyl, ethyl, propyl or butyl. $Z^\theta$ is a corresponding anion and can include the halides such as chloride, bromide, iodide, hydroxide or nitrate; where chloride and hydroxide are most preferred.

The monoepoxides optionally employed herein correspond to the formula:

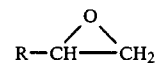

wherein R is hydrogen or an inertly substituted species such as hydroxyl, lower alkyl, aryl or alkaryl. The most preferred monoepoxide is ethylene oxide.

For purposes of this invention, the term "vinyl functional monoahl" is an $\alpha,\beta$-ethylenically unsaturated monoahl and is represented by the formula:

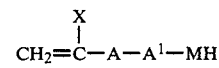

wherein X is hydrogen, lower alkyl, halo-substituted alkyl, aryl and the like; preferably hydrogen or methyl. A is, for example,

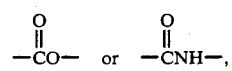

preferably

$A^1$ is a suitable carbon-containing, connecting fragment such as alkylene, arylene, or the like; most preferably ethylene or propylene. MH represents an active hydrogen moiety. For purposes of this invention, an active hydrogen moiety refers to a moiety containing a hydrogen atom which, because of its position in the molecule, displays significant activity according to the Zerewitinoff test described by Wollen in the *Journal of the American Chemical Society*, Vol. 49, page 3181 (1927). Illustrative of such active hydrogen moieties for purposes of this invention are —OH, —NH₂ and —SH. Most preferably, the vinyl functional monoahls are vinyl functional monools (i.e., MH is OH). Most preferably, vinyl functional monools are the derivatives of acrylic acid or methacrylic acid and include hydroxyalkyl acrylates, hyroxyalkyl methacrylates, hydroxyaryl acrylates, and hydroxyaryl methacrylates. Especially preferred vinyl functional monoahls are 2-hydroxypropyl acrylate, 2-hydroxyethyl acrylate, 2-hydroxypropyl methacrylate and 2-hydroxyethyl methacrylate.

As used herein, the term "vinyl functional monoahl" also includes the reaction product of about 1 equivalent of the vinyl functional monoahl as previously defined or a species such as acrylic acid or acrylamide with a desired amount of monoepoxide to yield the unsaturated species linked through a polyether moiety to a terminal hydroxyl group. Such a reaction is performed using known techniques. The amount of monoepoxide which is reacted with said vinyl functional monoahl can vary; however, it is typical to employ up to about 20, preferably from 1 to about 10 equivalents of monoepoxide per equivalent of vinyl functional monoahl.

The novel monomers of this invention are prepared by reacting an aforementioned ammonium compound with an equivalent molar or a slight molar excess of the desired vinyl functional monoahl in a small amount of a solvent such as water. A diluted solution of strong base, such as sodium hydroxide, is slowly added, preferably dropwise. The amount of base employed is preferably a molar amount about equal to that of the vinyl functional monoahl. The mixture is reacted at about 20° to about 50° C. for about 4 to about 24 hours. The pH of the final mixture is greater than 7 but most desirably less than 10. The product is employed in the form of the reaction mixture in forming the polymer of this invention or isolated using known techniques such as evaporation of solvent.

The polymerization of the above-described novel monomers and/or the copolymerization of the novel monomers with other monomers is readily carried out by mixing the monomers in a solvent such as water with a free radical catalyst under conditions sufficient to cause free radical addition polymerization. The temperature of the polymerization is dependent upon the initiator and is preferably in the range of 100 to about 1000 ppm. Other polymerization processes such as the continuous, batch or those processes described in U.S. Pat. Nos. 3,284,393; 4,376,850 and Re. 28,474 can also be employed.

Catalysts suitably employed in the practice of the polymerization are free radical type polymerization catalysts such as the peroxides, persulfates, perborates, percarbonates, azo compounds and the like. Examples of such catalysts include hydrogen peroxide, di(t-butyl)-peroxide, t-butyl peroctoate, lauroyl peroxide, cumene hydroperoxide, t-butyl hydroperoxide, azobis-(isobutyronitrile) as well as mixtures of such catalysts. Of the foregoing catalysts, azobis(isobutyronitrile) and peroxy esters such as t-butyl peroctoate and t-butyl perbenzoate are preferred.

In addition to the foregoing catalysts, chain transfer agents such as mercaptans, e.g., dodecanethiol, and carbon tetrahalides such as carbon tetrachloride may be employed in conventional amounts to control the molecular weight of the copolymerizate.

The polymers of this invention exhibit a surprisingly high affinity for water. This is believed to be due to the side chain which contains ether linkage(s) and hydroxyl group(s). That is, it is believed that the side chain allows for a greater volume of water of hydration and also allows better orientation of the side chain to maximize the solubility of the polymer in water. This effect is also believed to maximize the wettability and antistatic properties exhibited by copolymers comprising the novel monomer of this invention.

Suitable ethylenically unsaturated monomers (so-called other monomers or other ethylenically unsaturated monomers), which are copolymerized to form interpolymers with the novel monomer, include aliphatic conjugated dienes such as butadiene and isoprene; monovinylidene aromatic monomers such as styrene and α-methyl styrene, α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl) acrylamide, and the like; vinyl esters such as vinyl acetate; vinyl ethers; vinyl ketones; vinyl and vinylidene halides as well as a wide variety of other ethylenically unsaturated materials. Preferred monomers include hydroxyethyl acrylate, acrylamide, acrylic acid, ethyl acrylate and sec-butyl acrylate.

The amount of other comonomers which can be copolymerized with the novel monomer of this invention can vary depending upon the balance of properties desired. Specific amounts can vary from 2 to about 98 weight percent novel monomer based on the weight of all monomers. Polymers comprising small amounts (i.e., less than about 10 weight percent based on all monomers) of novel monomer are wettable. Moderate to high amounts of novel monomer in the polymer are water-soluble, however, the solubility is also dependent upon the other comonomer which is employed.

It is desirable to incorporate an amount of a polyvinyl crosslinking monomer into the polymer. The polyvinyl crosslinking monomers which are copolymerized with the aforementioned ethylenically unsaturated comonomers can include, for example, divinylbenzene, N,N'-methylene diacrylamide, diallyl maleate, the divinyl ethers of ethylene glycol or diethylene glycol diacrylate, polyethylene glycol diacrylates or methacrylates, and the like.

The polymers comprising novel monomers and, optionally, other monomers and crosslinked monomers are solvent and water-insoluble, but swell and retain water to yield a "high energy coating." By "high energy" is meant easily wettable by liquids such as water or an aqueous solution containing strong electrolytes.

It is also desirable to contact a solution of the water-soluble form of the interpolymer of this invention with an anionic polymer such as a polymer or copolymer of acrylamide, 2-acrylamido-2-methylpropane sulfonic acid and/or acrylic acid, or the salts thereof. In such a way, polysalt films are formed which are highly hydrophilic, but not water-soluble.

Utilities of the homopolymers and interpolymers of this invention are useful as retention aids for fillers and pigments, as well as sizes for papermaking. Other uses include paper retention aids for flocculation of fines in papermaking. Utility in the textile industry includes the use of the homopolymer or interpolymer as an antistatic finish and as a moisture retention aid in diapers and other such fabrics. The homopolymers and interpolymers are also useful as electroconductive resins. The cationic polymers are also useful as flocculants for sewage and waste waters. Other uses include the treatment of anionic starch to improve the cationic character. The polymers can also be useful as wettable coatings for improving the wettability of hydrophobic materials. Crosslinked homopolymers and interpolymers are useful as water retention coatings.

The following examples are included to illustrate the invention but not to limit the scope thereof. All parts and percentages are by weight unless otherwise specified.

EXAMPLE 1

The novel monomer is prepared as follows. A 30.5-g (0.162) portion of 2-hydroxy-3-chloropropyl trimethyl ammonium chloride, 6.6 ml of water and 20.0 g (0.174 mole) of 2-hydroxyethyl acrylate are charged into a 1-liter reactor. A 326-ml portion of 1N (0.174 mole) sodium hydroxide is added dropwise for 30 minutes and the mixture is reacted at 23° C. for 15 hours. The reaction mixture contains 10.7 percent monomer as determined by liquid chromatography. The pH of the mixture is 9.1 and the yield is 79.4 percent. The monomer has the following structure:

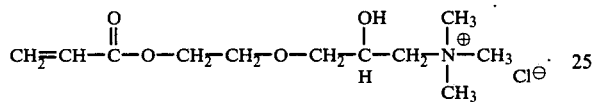

This reaction mixture is used as such in further reactions involving polymer preparation.

The monomer is isolated by evaporating the water and unreacted 2-hydroxypropyl acrylate. The viscous liquid is filtered to remove any sodium chloride precipitate. The liquid is further evaporated at 50° C. under vacuum overnight. The monomer is a white hygroscopic solid and is recrystallized in acetone.

EXAMPLE 2

The homopolymer is prepared as follows. A 50-ml portion of the reaction mixture prepared in Example 1 is heated with stirring in a 200 ml reactor fitted with a reflux condenser and a nitrogen bubbling device. To this mixture is charged 0.005 g of ammonium persulfate. The mixture is heated at 75° C. and stirred for 6 hours. The polymer is recovered by precipitation with 600 ml of methanol. The liquid phase is poured off and the polymer is washed with methanol and dried at 40° C. for 3 hours.

EXAMPLE 3

A copolymer is prepared as follows. A 50-ml portion of the reaction mixture prepared in Example 1 is placed into a 200 ml reactor as described in Example 2. A 40-ml portion of acetone is added and the mixture is heated to 55° C. using an ultraviolet lamp. About 0.1 g of potassium persulfate is added. A 3.5-g portion of sec-butyl acrylate in 10 ml of acetone is added dropwise over a 5.5-hour period. The reaction mixture is cooled to 0° C. and the copolymer precipitate is recovered by filtration. The product is washed on a filter with methanol and air dried. The polymer is 10.3 percent novel monomer and 89.7 percent sec-butyl acrylate.

What is claimed is:

1. A homopolymer having difunctional mers of the formula:

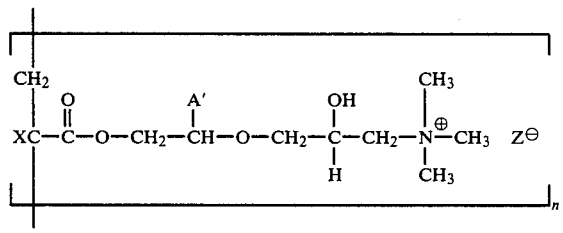

wherein
  X is selected from the group consisting of a hydrogen ion and a methyl group;
  A' is selected from the group consisting of a hydrogen ion and a methyl group;
  $Z^\theta$ is an anion selected from the group consisting of chloride, bromide, iodide, hydroxide, and nitrate; and
  n represents the number of mers forming the homopolymer.

2. An interpolymer derived from the polymerization of at least one mer shown in claim 1 with at least one ethylenically unsaturated monomer.

3. A interpolymer of claim 2 wherein said other monomer is selected from a member of the group consisting of hydroxyethyl acrylate, acrylamide, acrylic acid, ethyl acrylate and sec-butyl acrylate.

* * * * *